United States Patent
Lin et al.

(10) Patent No.: US 9,049,926 B2
(45) Date of Patent: Jun. 9, 2015

(54) DIGITAL FURNITURE PIECE

(71) Applicant: GIGAZONE INTERNATIONAL CO., LTD., New Taipei (TW)

(72) Inventors: Po Yu Lin, New Taipei (TW); Bing Zhou, New Taipei (TW); Dong Jie Tang, New Taipei (TW)

(73) Assignee: GIGAZONE INTERNATIONAL CO., LTD., New Taipei (TW)

( * ) Notice: Subject to any disclaimer, the term of this patent is extended or adjusted under 35 U.S.C. 154(b) by 185 days.

(21) Appl. No.: 13/755,630

(22) Filed: Jan. 31, 2013

(65) Prior Publication Data

US 2013/0322008 A1  Dec. 5, 2013

(30) Foreign Application Priority Data

Jun. 5, 2012  (CN) .................... 2012 2 0262718 U (51) Int. Cl.
  *G06F 1/16*  (2006.01)
  *A47B 21/04*  (2006.01)
  *A47B 21/00*  (2006.01)
  *G06F 1/18*  (2006.01)

(52) U.S. Cl.
  CPC .................. *A47B 21/04* (2013.01); *A47B 21/00* (2013.01); *A47B 2200/0073* (2013.01); *G06F 1/187* (2013.01); *G06F 1/188* (2013.01)

(58) Field of Classification Search
  USPC ............ 361/679.37; 312/223.1, 223.2, 223.3, 312/223.6; 108/50.01, 50.02
  See application file for complete search history.

(56) References Cited

U.S. PATENT DOCUMENTS

| | | | | |
|---|---|---|---|---|
| 5,558,418 | A * | 9/1996 | Lambright et al. | 312/321.5 |
| 6,070,956 | A * | 6/2000 | Yates | 312/223.3 |
| 6,099,094 | A * | 8/2000 | Lior | 312/223.3 |
| 6,102,476 | A * | 8/2000 | May et al. | 297/217.3 |
| 6,619,765 | B2 * | 9/2003 | Visser et al. | 312/194 |
| 6,654,236 | B2 * | 11/2003 | Chen et al. | 361/679.55 |
| 6,711,002 | B1 * | 3/2004 | Fan | 361/679.02 |
| 6,755,491 | B2 * | 6/2004 | McElheney | 312/242 |
| 6,827,409 | B2 * | 12/2004 | Michael | 312/223.3 |
| 6,870,739 | B2 * | 3/2005 | Groos et al. | 361/725 |
| 6,999,320 | B2 * | 2/2006 | Fan | 361/725 |
| 7,029,079 | B2 * | 4/2006 | Holt | 312/223.3 |
| 7,042,716 | B2 * | 5/2006 | Shearman | 361/679.08 |

(Continued)

FOREIGN PATENT DOCUMENTS

| | | |
|---|---|---|
| CN | 201806186 U | 4/2011 |
| TW | 472540 | 1/2002 |
| TW | M304189 | 1/2007 |

*Primary Examiner* — Lisa Lea Edmonds
(74) *Attorney, Agent, or Firm* — Chun-Ming Shih (57) ABSTRACT

An article of digital furniture piece comprises a table and a computer disposed in an accommodating space of the table, the computer comprises a frame, and a power supply, a hard disk and a host are disposed thereon. The frame comprises a first frame body and a second frame body connected each other, the first frame body is able to overturn relative to the second frame body according to the shape of the accommodating space, for matching the shape of the computer and the shape of the accommodating space, such that the appearance of the digital furniture piece could have variety designs.

8 Claims, 8 Drawing Sheets

(56) References Cited

U.S. PATENT DOCUMENTS

| | | |
|---|---|---|
| 7,047,890 B2 * | 5/2006 | Korber et al. ............... 108/50.01 |
| 7,100,516 B2 * | 9/2006 | Riddiford et al. ........... 108/50.01 |
| 8,087,738 B2 * | 1/2012 | Henriott et al. ............. 312/223.6 |
| 8,091,969 B2 * | 1/2012 | Caveney et al. .............. 312/248 |
| 8,596,204 B2 * | 12/2013 | Costamagna ..................... 108/6 |
| 2007/0170826 A1 * | 7/2007 | Tsao .......................... 312/223.3 |
| 2009/0102335 A1 * | 4/2009 | Hancock et al. ............ 312/223.3 |
| 2010/0096960 A1 * | 4/2010 | Lee ............................... 312/194 |

\* cited by examiner

DIGITAL FURNITURE PIECE

CROSS-REFERENCE TO RELATED APPLICATIONS

This application claims the benefit of the filing date of China Patent Application No. 201220262718.4, filed on 5 Jun. 2012 with the State Intellectual Property Office (SIPO) of the People's Republic of China, the disclosure of which is incorporated herein in its entirety by reference.

BACKGROUND OF THE INVENTION

1. Field of the Invention

The present invention relates to furniture, and more particularly to furniture combined with a computer.

2. Description of the Prior Art

In modern times, computer is one of the most popular electronic devices in daily life. Generally, the computer is composed of a housing and several electronic components such as a power supply, hard disk, host and the like. Usually, it is placed under a home or office desk for leaving as much space as possible on the desk.

Also, for practical and aesthetic reasons, a desk integrated with a cabinet thereunder for receiving the computer is developed. However, since the current computer housing is generally designed in the form of cuboid, the shape of the cabinet is confined so as to fit the computer housing geometrically. Therefore, the overall appearance of the desk is undiversified and inflexible.

SUMMARY OF THE INVENTION

In view of the above, the present invention provides a digital furniture piece that can solve the problems of the dull appearance of the existing desk having the computer cabinet and may bring about a delightful working environment for the user.

The present invention discloses an article of digital furniture piece. The digital furniture piece of the present invention includes a table and a computer, the table is formed with an accommodating space, and the computer is contoured to fit and disposed in the accommodating space of the table. The computer comprises a frame and a power supply, a hard disk and a host which are disposed in the frame. The frame includes a first frame body and a second frame body that is provided with a hinge, the first frame is connected with and able to pivot on the hinge with respect to the second frame body to an extent according to the shape of the accommodating space.

The effect of the present invention is achieved in the following way. The size of the computer can fit that of the accommodating space of the table by pivoting the first frame body with respect to the second frame body, such that the shape of the table can be designed or modified desirably, making the overall appearance or geometry of the table is more flexible and diversified and providing more delightful working environment to the user.

The characteristics, realization and functions of the invention are disclosed in the following description with reference to the preferred exemplified embodiments and the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

By referring to FIGS. 1-4, the digital furniture piece 1 of the first embodiment in the present invention includes a computer 10 and a table 20. The computer 10 includes a frame 110, a host 120, a power supply 130 and a hard disk 140. The frame 110 is composed of a first frame body 111 and a second frame body 112 having a hinge 113 connected to the first frame body 111, in which the first frame body 111 is capable of rotating around or pivoting on the hinge 113 with respect to the second frame body 112 to such an extent that the frame 110 is developed at full length (i.e., the first frame body 111 forms a straight angle, 180 degrees, with the second frame body 112) or becomes folded-up (i.e., the first frame body 111 covers the second frame body 112).

Figure 2:
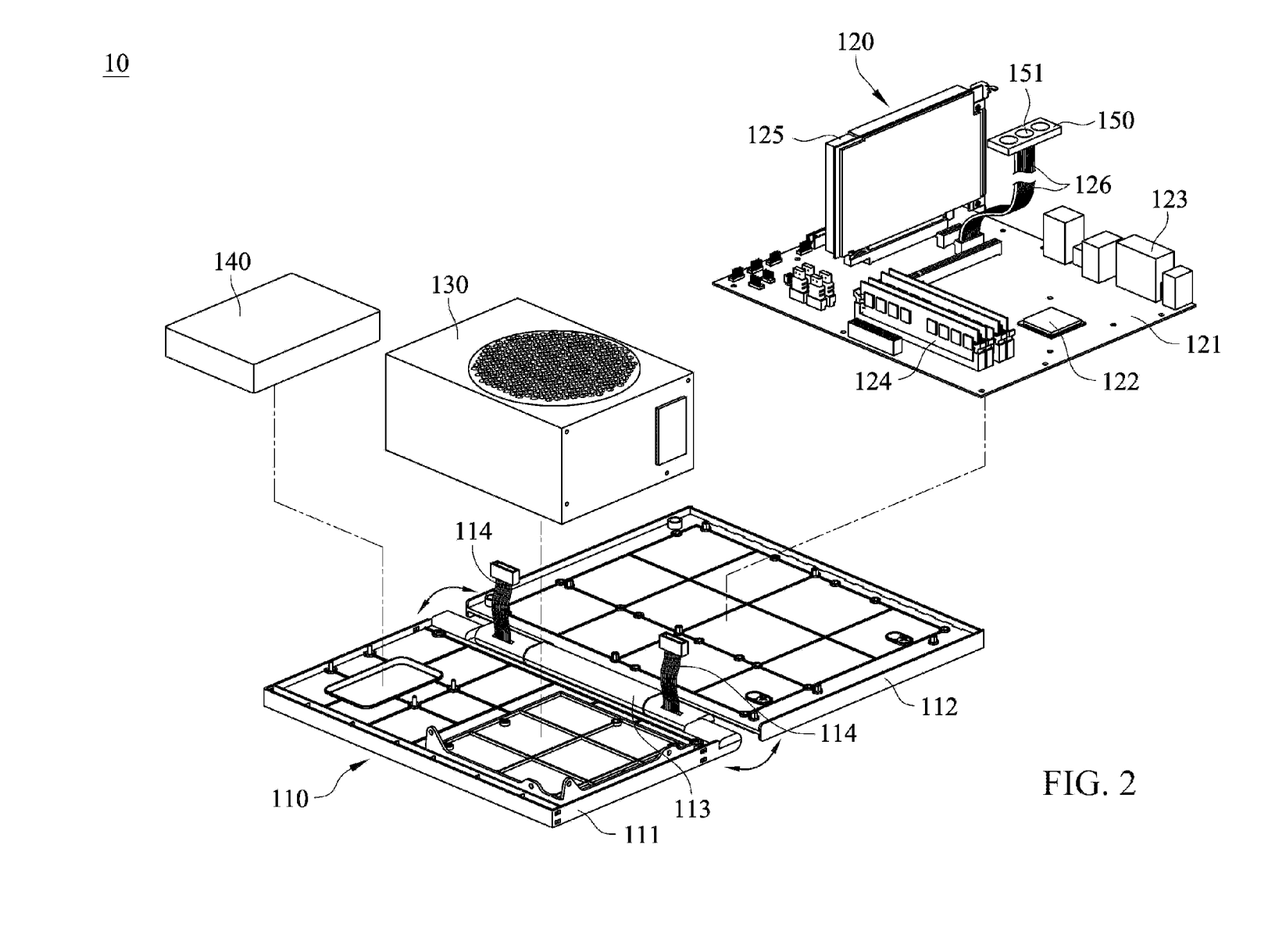
FIG. 2 is an exploded view of a computer according to the first embodiment of the present invention.
Figure 3:
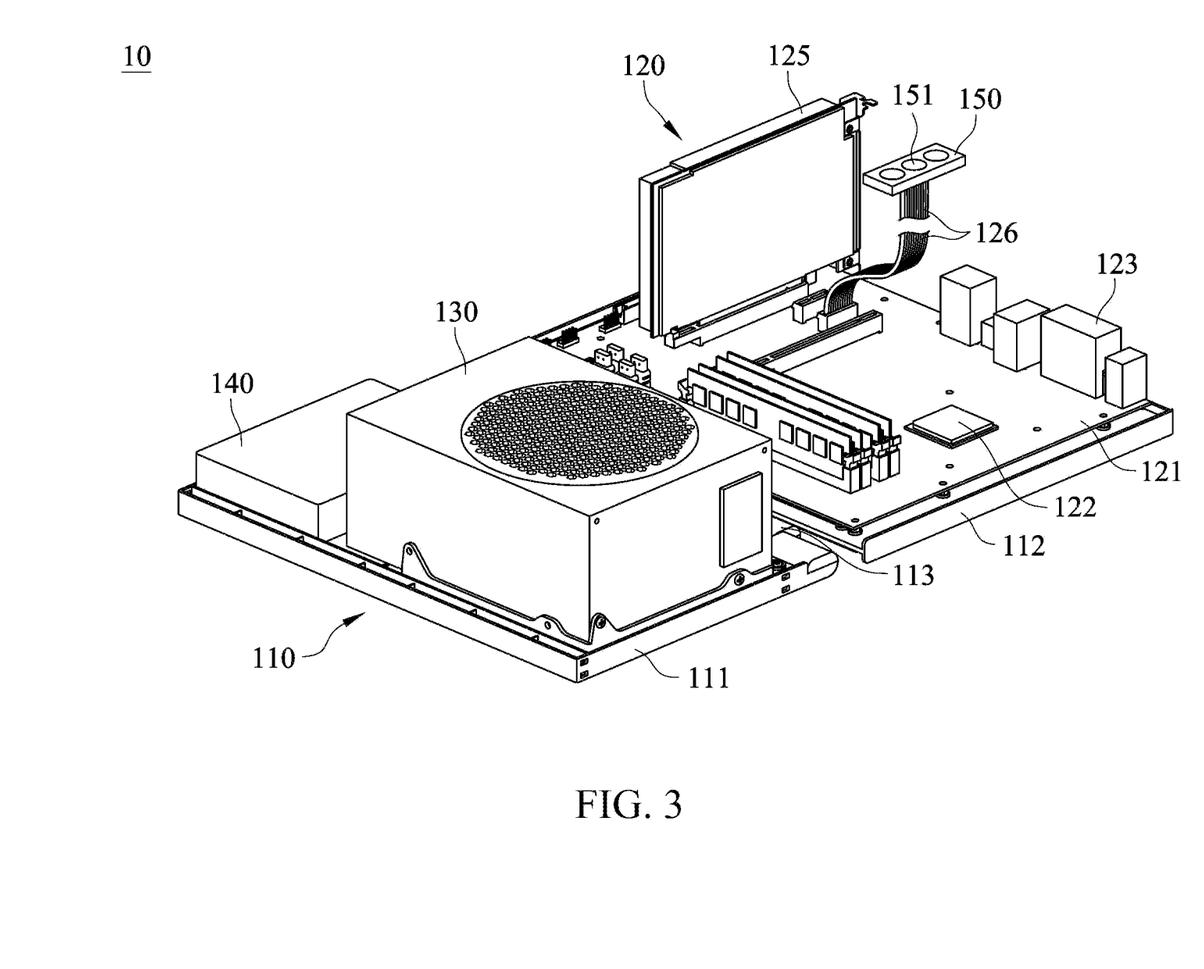
FIG. 3 is a schematic assembly view of the computer according to the first embodiment of the present invention.

Optionally, a plurality of cables 114 are placed inside the hinge 113 for connecting the power supply 130 and the hard disk 140 to the host 120 electrically.

The host 120 of the computer 10 includes a circuit board 121 on which the electronic components such as a central processing unit (CPU) 122, electronic connector 123, memory 124 and graphic card 125 are disposed. The host 120 of the computer 10 is disposed on the second frame body 112 of the frame 110, and the power supply 130 and the hard disk 140 are disposed on the first frame body 111 of the frame 110 and respectively connected to the host 120 electrically. The power supply 130 and the hard disk 140 may be disposed on the same side or opposite side of the first frame body 111 of the frame 110.

Moreover, the computer 10 may further comprise a control panel 150 for operating the computer 10 conveniently. The control panel 150 is electrically connected to the host 120 via a cable 126, and a power switch 151 and at least one connection port and/or audio input/output interface are electrically disposed on the control panel 150 optionally.

Figure 1:
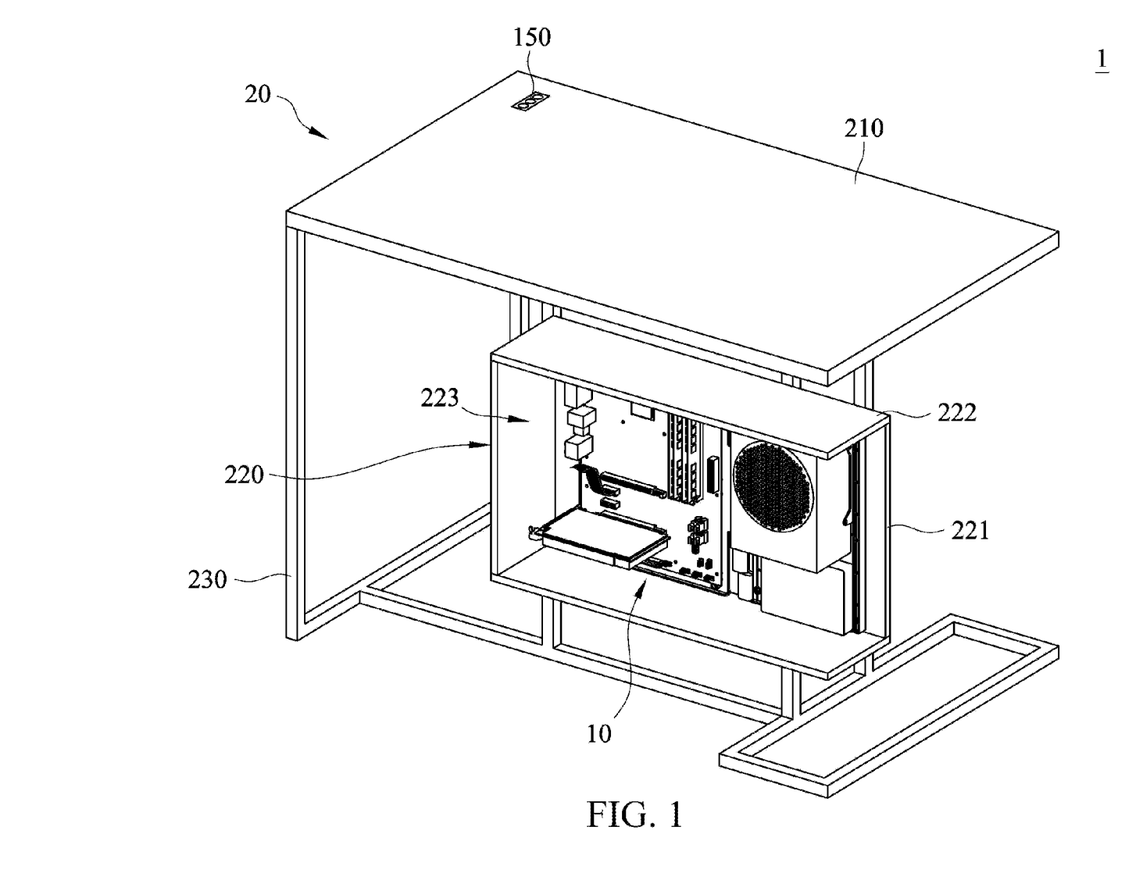
FIG. 1 is a schematic assembly view of digital furniture piece according to a first embodiment of the present invention.
Figure 4:
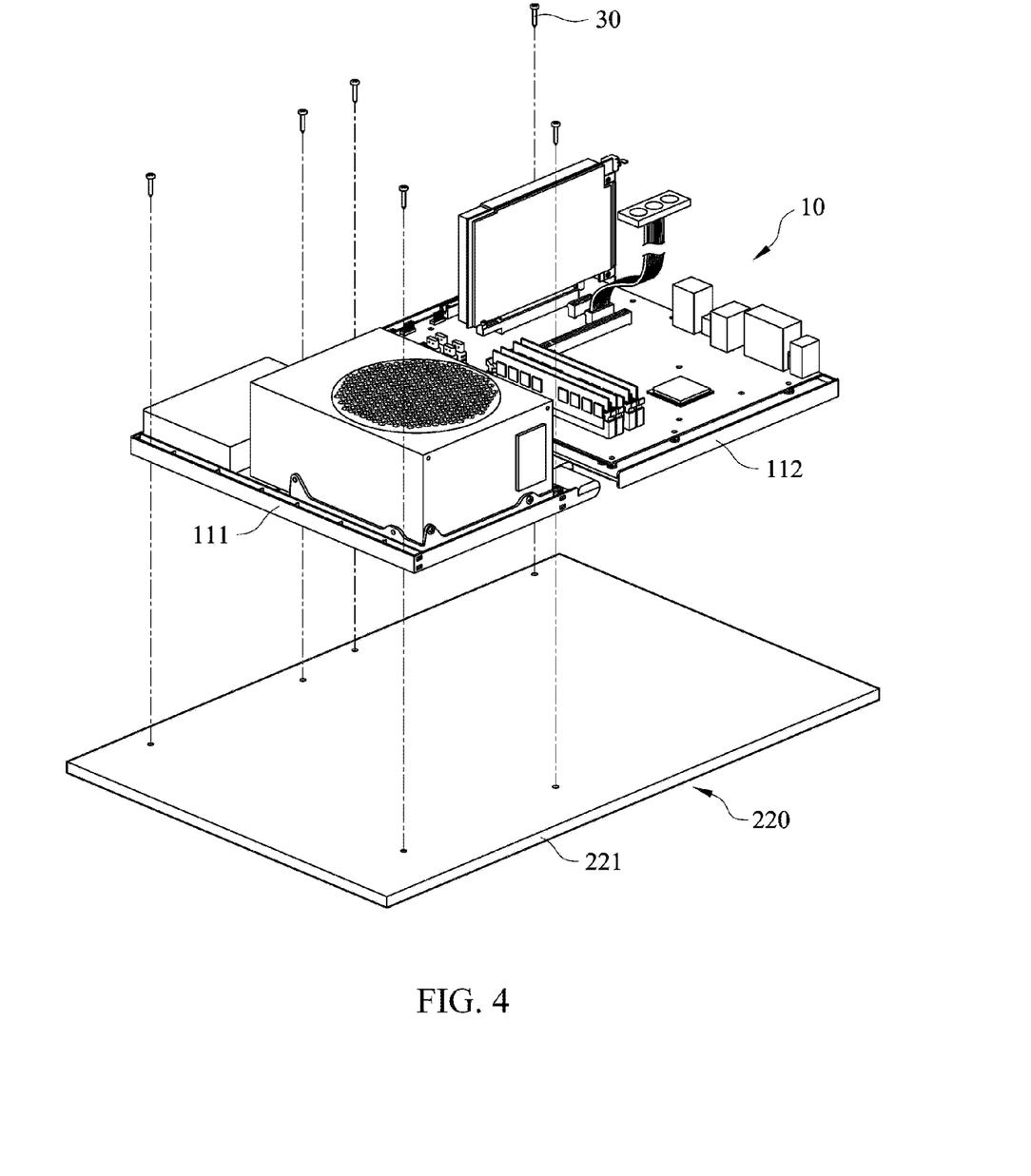
FIG. 4 is a partially exploded view of the digital furniture piece according to the first embodiment of the present invention.

The table 20 includes a desktop 210, a bearing part 220 and a bracket 230 connected with the desktop 210 and on which the bearing part 220 is disposed. In this embodiment, the bracket 230 may serve as a table leg standing on the ground to support the desktop 210 and the bearing part 220. However, it is understood that the table 20 can, for example, only includes a desktop 210 and a bearing part 220 which serves as a direct support for the desktop 210. Such variation of the table structure is exemplary and should not be construed as a limitation to the present invention.

The bearing part 220 of the table 20 includes a bottom 221 and side plates 222 surrounding and connected to the bottom 221, and an accommodating space 223 is formed by the side plates 222 and the bottom 221. In this embodiment, the bearing part 220 is formed as a cuboidal receptacle with an accommodating space 223. As a result, shape of the accommodating space 223 is determined by the construction of the bearing part 220. In particular, the size of the bottom 221 fits the frame 110 of the computer 10 in the developed state at full length, and the size of the side plates 222 fits those of the host 120, power supply 130, and hard disk 140 provided on the frame 110 of the computer 10.

Therefore, when mounting the computer 10 in the bearing part 220 of the table 20, as a first step, the first frame body 111 of the frame 110 is pivoted on the hinge 113 to form a straight angle of 180° with the second frame body 112 of the frame 11. Then, the computer 10 is placed in the accommodating space 223 of the bearing part 220, followed by fastening the first frame body 111 and the second frame body 112 of the frame 110 to the bottom 221 of the bearing part 220 by fasteners 30 such as screws.

The control panel 150 of the computer 10 may be, for example, mounted on and exposed from the desktop 210 of the table 20 to facilitate the operation and wiring of the computer 10. Thus, the computer peripherals are allowed to be electrically connected to the computer 10 via the connection ports of the control panel 150 conveniently since the user does not have to stoop or squat down to perform the above work of the computer 150 under the desktop 210 of the table 20.

Figure 5:
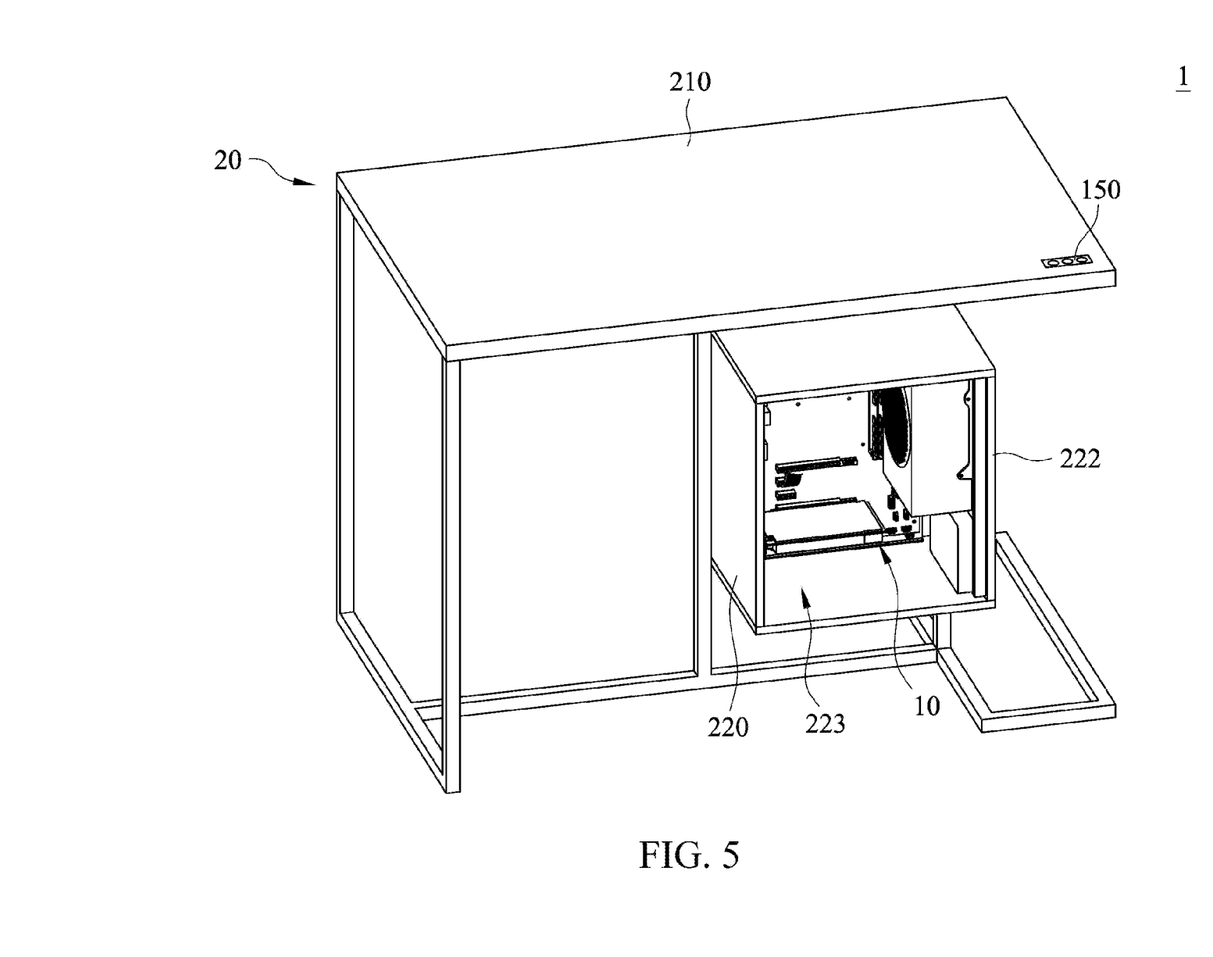
FIG. 5 is a schematic assembly view of digital furniture piece according to a second embodiment of the present invention.
Figure 6:
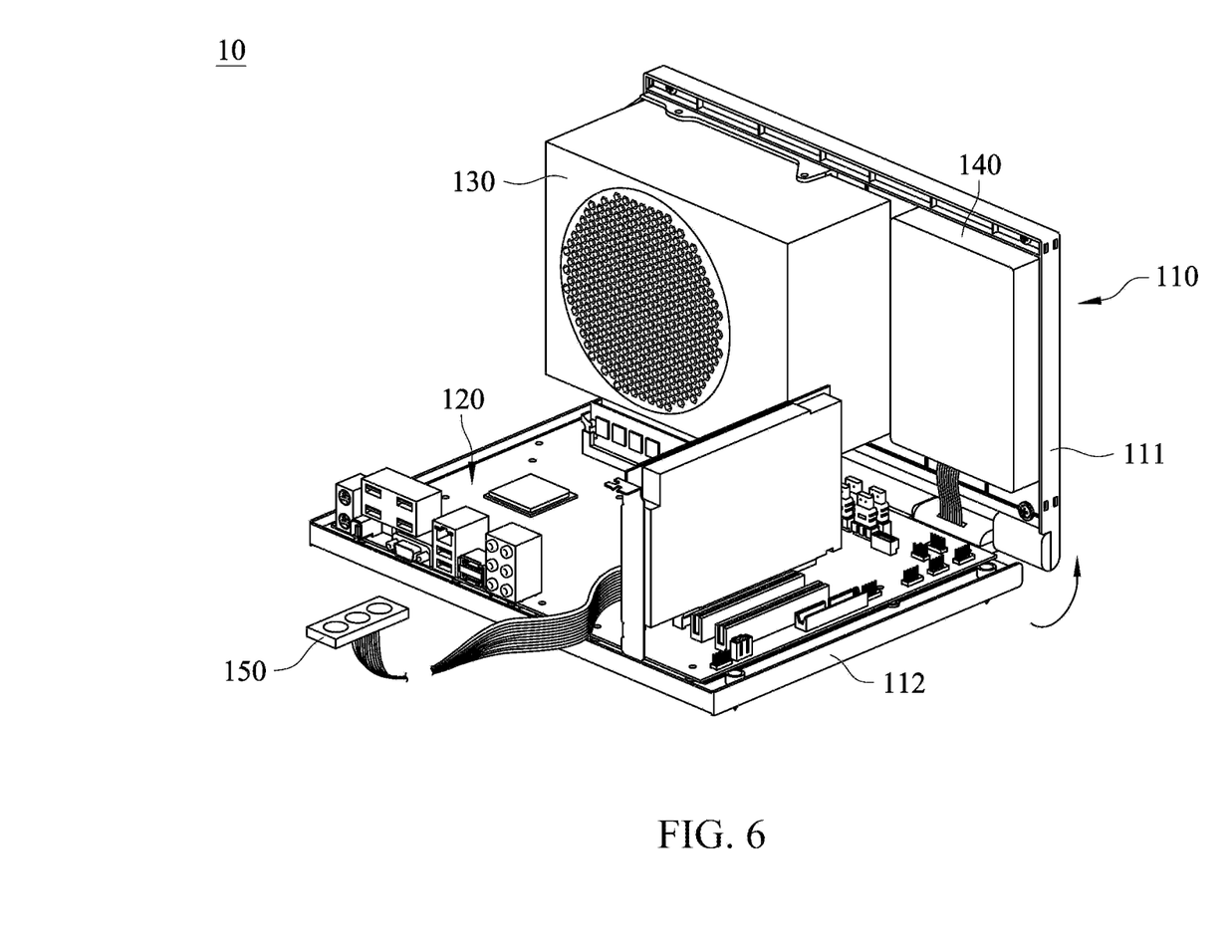
FIG. 6 is a schematic assembly view of a computer according to the second embodiment of the present invention.

Referring to FIGS. 5 and 6, a digital furniture piece 1 of the second embodiment of the present invention is similar to that of the first embodiment except that the bearing part 220 of the table 20 is in the form of a cube as well as the accommodating space 223. In particular, the size of the bottom 221 of the bearing part 220 fits that of the second frame body 112 of the frame 110 where the host is disposed, and the size of the side plates 222 fits that of the first frame body 111 of the frame 110.

Under this condition, when mounting the computer 10 on the bearing part 220 of the table 20, as a first step, the first frame body 111 of the frame 110 is pivoted on the hinge 113 to form an included angle of 90° or less with the second frame body 112, making the power supply 130 and the hard disk 140 more approximate to the host 120. In this way, the size of the computer 10 can fit that of the accommodating space 223 of the bearing part 220. Then, similarly, the computer 10 is placed in the accommodating space 223 of the bearing part 220, followed by fastening the first frame body 111 and the second frame body 112 of the frame 110 to the bottom 221 of the bearing part 220 by fasteners 30 such as screws.

Alternatively, the size of the bottom 221 of the bearing part 220 fits that of the first frame body 111 of the frame 110 where the power supply 130 and hard disk 140 are disposed, and the size of the side plates 222 of the bearing part 220 fits that of the second frame body 112 of the frame 110. It is to be noted that the above arrangement is illustrative rather than limitative. The computer 10 may be fit into the accommodating space 223 of the bearing part 220 in other orientations.

Figure 7:
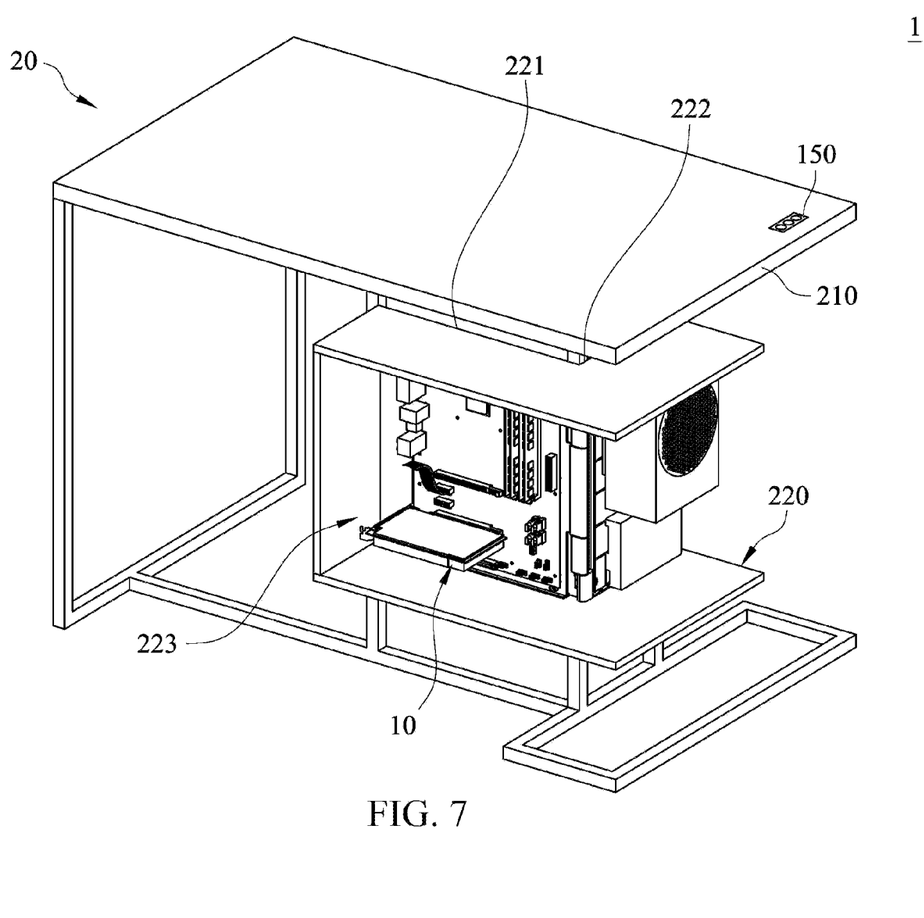
FIG. 7 is a schematic assembly view of digital furniture piece according to a third embodiment of the present invention.
Figure 8:
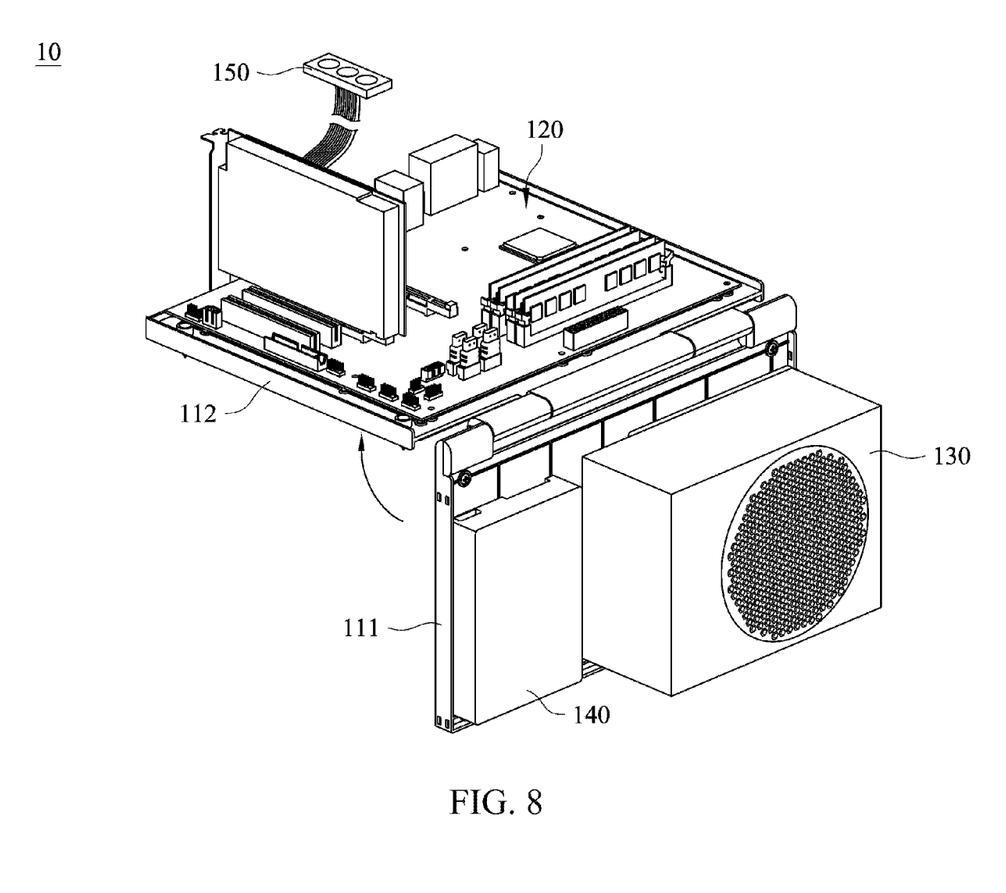
FIG. 8 is a schematic assembly view of a computer according to the third embodiment of the present invention.

Referring to FIGS. 7 and 8, the digital furniture piece 1 of the third embodiment is similar to that of the first embodiment in structure except in the former, the bearing part 220 of the table 20 is a L-shaped receptacle having a long side and a short side. So the accommodating space 223 is formed to be L-shaped in the bearing part 220. In particular, in this embodiment, the size of the bottom 221 of the bearing part 220 fits that of the second frame body 112 of the frame 110 where the host 120 is disposed, and that of the side plates 222 of the bearing part 220 fit that of the first frame body 111 of the frame 110 where the power supply 130 and the hard disk 140 are disposed.

Based on the above structure, when mounting the computer 10 on the bearing part 220 of the table 20, the first frame body 111 of the frame 110 is pivoted on the hinge 113 to form an included angle of more than 180° (and less than 360° of course) with the second frame body 112, making the power supply 130 and the hard disk 140 away from the host 120. In this way, the size of the computer 10 can fit that of the accommodating space 223 of the bearing part 220 that is in an L-shaped form. Then, the computer 10 is placed in the accommodating space 223 of the bearing part 220, followed by fastening the first frame body 111 and the second frame body 112 of the frame 110 to the bottom 221 of the bearing part 220 by fasteners 30 such as screws.

Furthermore, in the second and third embodiments of the present invention, the control panel 150 of the computer 10 is mounted on the desktop 210 of the table 20 in a position different to the first embodiment. However, in practice, the control panel 150 may be mounted elsewhere on the table 20 if desired or required.

As stated above, the effect of the present invention can be achieved by the rotatable first frame body of the frame with respect to the second frame body. By virtue of this, the shape of the bearing part of the table can be designed or modified desirably. In this way, the overall appearance or geometry of the table is more flexible and diversified, making the working environment more delightful. Moreover, the digital furniture piece of the present invention is capable of providing a friendly environment for the user to operate the computer conveniently, along with the control panel which can be mounted on a suitable and comfortable position of the table desirably. The user has no need to stoop or squat down to boot the computer or connect the computer peripherals or the like.

From the above description of the invention, it is manifest that various techniques can be used for implementing the concepts of the invention without departing from the scope thereof. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It is intended that the scope of the invention is defined by the appended claims.

What is claimed is:
1. A digital furniture piece, comprising:
a table having an accommodation space; and
a computer contoured to fit and disposed in the accommodating space of the table, the computer comprising a frame and a power supply, a hard disk and a host disposed in the frame, the frame comprising a first frame body and a second frame body that is provided with a hinge, the first frame being connected with and able to pivot on the hinge with respect to the second frame body to an extent according to the shape of the accommodating space; and
a plurality of cables located inside the hinge of the frame, wherein one end of each of the cables is connected to the host, while the other end of each of the cables passes through a through hole on the peripheral of the hinge and is connected to the power supply and the hard disk respectively.

2. The digital furniture piece of claim 1, wherein the accommodating space comprises a first sidewall and a second sidewall connected each other, and the first and the second frame bodies of the computer are disposed on the first and the second sidewalls respectively.

3. The digital furniture piece of claim 1, wherein the table comprises a desktop and a bearing part connected to the desktop, and the accommodating space is formed on the bearing part.

4. The digital furniture piece of claim 3, wherein the table further comprises a bracket connected to the desktop, the bearing part is placed on the bracket.

5. The digital furniture piece of claim 3, wherein the computer further comprises a control panel mounted on and exposed from the desktop of the table.

6. The digital furniture piece of claim 1, wherein the power supply and the hard disk are disposed on the first frame body of the frame, and the host is disposed on the second frame body of the frame.

7. The digital furniture piece of claim 1, wherein the power supply and the host are located at the same side of the frame.

8. The digital furniture piece of claim 1, wherein the power supply and the host are located at the opposite side of the frame.

\* \* \* \* \*